United States Patent [19]
Kono et al.

[11] Patent Number: 5,722,786
[45] Date of Patent: Mar. 3, 1998

[54] UNIVERSAL JOINT

[75] Inventors: Katsuyuki Kono, Toyota; Masami Wakita, Nagoya, both of Japan

[73] Assignee: Chuouhatsujou Kabushiki Kaisha, Nagoya, Japan

[21] Appl. No.: 754,901

[22] Filed: Nov. 22, 1996

Related U.S. Application Data

[63] Continuation of Ser. No. 525,472, Sep. 11, 1995, abandoned.

[30] Foreign Application Priority Data

Sep. 30, 1994 [JP] Japan ................... 6-261550

[51] Int. Cl.$^6$ .............. B60G 11/48; F16B 7/00
[52] U.S. Cl. .............. 403/228; 403/225; 280/673; 280/688
[58] Field of Search ............... 403/225–228, 403/220; 280/673, 723, 721, 688, 689

[56] References Cited

U.S. PATENT DOCUMENTS

| | | | |
|---|---|---|---|
| 1,939,444 | 12/1933 | Geyer | 403/228 X |
| 1,947,489 | 2/1934 | Nold | 403/225 X |
| 1,954,277 | 4/1934 | Zerk | 403/228 X |
| 2,294,452 | 9/1942 | Guy | 403/228 X |
| 2,797,929 | 7/1957 | Herbenar | 403/228 X |
| 2,855,212 | 10/1958 | Houser | 403/228 X |
| 3,233,928 | 2/1966 | Peickii et al. | 403/225 X |
| 3,976,338 | 8/1976 | Trachte et al. | 403/225 X |

*Primary Examiner*—Anthony Knight
*Attorney, Agent, or Firm*—Emmanuel J. Lobato; Burns & Lobato, P.C.

[57] ABSTRACT

A universal joint for coupling a pair of members with a connecting rigid link rockable about two sets of pivot axes. Each of the two members has a corresponding bolt hole through which extend respective stepped bolts defining two pivotal axes about which the link can pivot and rock. The link has opposite end portions each defining a loop through which extends a corresponding stepped bolt connecting a respective end of the link to a corresponding one of the two members the link couples. Each coupling bolt has a length with a major diameter extending axially through a respective coupled member and the corresponding loop of an end portion of the link to which it is coupled. An individual elastic sleeve is disposed circumferentially of the individual major diameter lengths of the bolts and a washer is disposed on each respective major diameter length between an end of the elastic sleeve and an internally threaded nut threaded on an external thread of a minor diameter length at the end of the individual stepped bolts. The link pivots about the elastic sleeves in opposite circumferential directions when coupled members rock. Provision is made for reducing play in the universal joint and allowing the link to pivot at either end about individual axes normal to the individual pivotal axes defined by the corresponding coupling bolts and elastic sleeves thereon. Each elastic sleeve has an elastic collar around each opposite end thereof disposed between the coupled member at one end and the link and at between the link and washer on an opposite end of the sleeve to define at opposite ends of the link corresponding axes normal to the pivotal axes defined by the respective coupling bolts.

5 Claims, 4 Drawing Sheets

UNIVERSAL JOINT

This is a continuation, of application Ser. No. 08/525,472, filed Sep. 11, 1995 now abandoned.

BACKGROUND OF THE INVENTION

1. Field of the Invention

This invention relates to a universal-couple used to joint a pair of members so that they may relatively rock not only around a single set of axes but also around another set of axes orthogonal to the first-mentioned set of axes.

2. Description of the Prior Art

For example, in order to joint opposite ends of a stabilizer bar for a motorcar to members on the car body such as lower arms in the manner as has been mentioned above, there are usually disposed appropriate links between the respective ends of the stabilizer bar and the associated lower arms so that the respective links and the stabilizer bar may relatively rock in two different directions, i.e., around fulcrum for the stabilizer bar and around the axes of the respective members on the car body.

While so-called ball-joint is optimal and widely used for adaptation to such multidirectional rocking movement, this ball-joint is disadvantageous in its high manufacturing cost.

To overcome this problem, a universal-joint using an elastic material such as rubber has been also adopted, of which typical embodiments are shown by FIGS. 5 and 6 in the accompanying drawings.

The embodiment of prior art shown by FIG. 5, on one hand, comprises a link a connected by a rubber bushing b to a stabilizer bar c and is advantageous in its simple construction as well as in its reasonable manufacturing cost. However, relative rocking movement of the stabilizer bar and the link occurring over the largest angle around an axis orthogonal to an axis of the rubber bushing b causes a significant elastic deformation of the rubber bushing b and this increases plays of the link a as well as the stabilizer bar c. As a result, it is difficult to achieve a desired anti-roll performance of the stabilizer bar c.

The embodiment of prior art shown by FIG. 6, on the other hand, comprises a bracket g fixed to a link e, a rubber bushing f put on a stabilizer bar d, and a bolt h extending through the rubber bush f so as to connect the link e to the stabilizer bar d. Certainly, the rocking movement occurring over the largest angle around an axis of the bolt h causes almost no elastic deformation of the rubber bushing f and plays of the link e and the stabilizer bar d are advantageously limited. However, this embodiment is still disadvantageous in its complicated construction, many parts to be machine-worked and therefore high manufacturing cost.

SUMMARY OF THE INVENTION

The problem as has been described above is solved, according to the invention, by an improved arrangement such that members on one side are formed with fitting holes into which stepped bolts are inserted, each of said stepped bolts having a forward small-diametered portion formed therearound with a male thread, whereas a rod member on the other side has opposite ends curved substantially in circular shapes and put on large-diametered portions of the respective stepped bolts so that said rod member may rock relatively to the first-mentioned members primarily around axes of the respective fitting holes but also around axes orthogonal to said axes of the respective fitting holes, wherein elastic members such as rubber pieces are applied against both sides of said each end curved substantially in a circular shape and a female thread formed on a nut is engaged with said male thread of each bolt.

According to the invention, as will be readily understood from the above-mentioned construction, the members on one side are formed with the fitting holes into which the stepped bolts each having the large-diametered portion and the small-diametered portion being stepwise continuous from the large-diametered portion and formed therearound with the male the male thread are inserted, respectively, and the opposite ends of the rod member curved substantially in circular shapes are put on the respective bolts without demand for brackets, so the construction is correspondingly simplified and the number of parts to be machine-worked is also correspondingly reduced. In addition, the elastic members such as rubber pieces are applied against the both side of the respective ends of the rod member curved substantially in circular shapes, allowing the universal-joint to be manufactured at a cost lower than the cost required for said embodiment of prior art shown by FIG. 6. Further more, elastic deformation of the elastic members can be effectively alleviated because the rod member rock relative to the first-mentioned members primarily around the axes of the respective fitting holes. Such feature of the invention is effective to restrict plays of the respective members to a practically tolerable extent comparable to the extent of such plays observed in said embodiment of prior art shown by FIG. 6.

DESCRIPTION OF PREFERRED EMBODIMENT

Now an embodiment of the invention as applied to joints between a stabilizer bar and lower arms for motorcar will be described in reference with FIGS. 1, 2 and 3 of the accompanying drawings.

Figure 1:
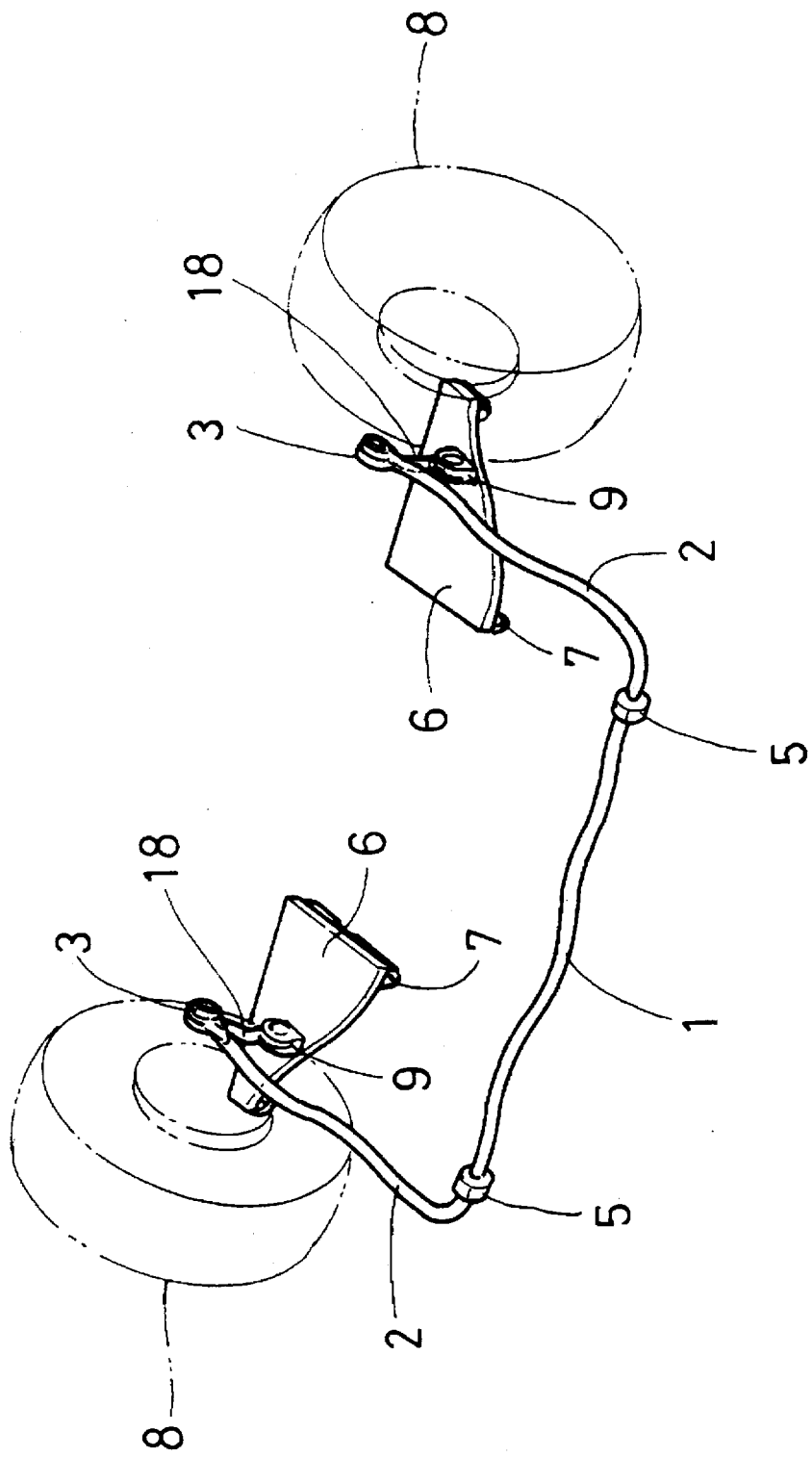
FIG. 1 is a perspective view schematically showing an embodiment of the invention.
Figure 2:
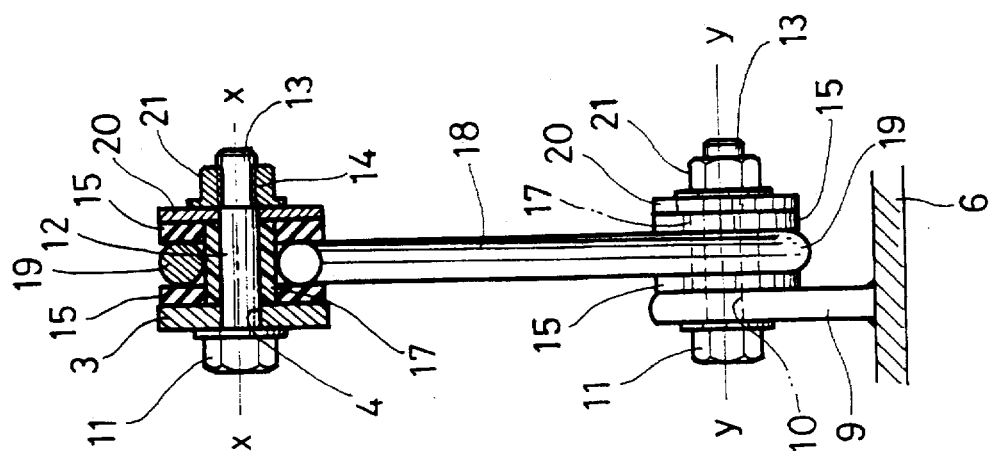
FIG. 2 is a front view of important parts in this embodiment as partially broken away.
Figure 3:
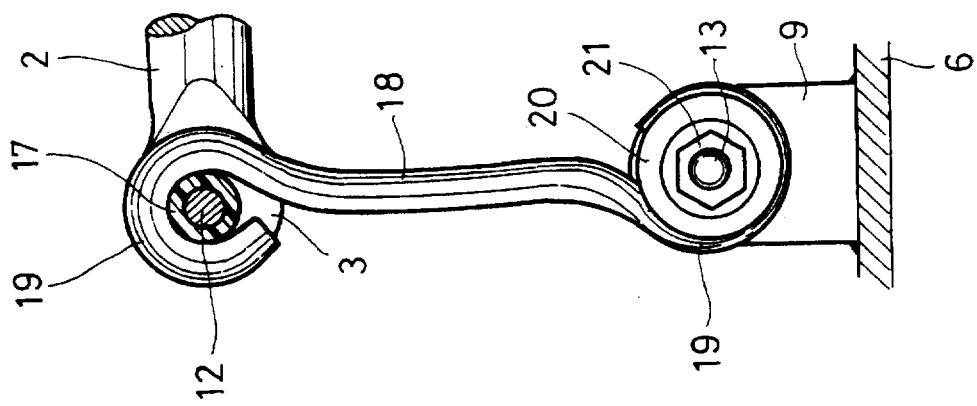
FIG. 3 is a side view showing the important parts in this embodiment as partially broken away.

Referrfing to FIGS. 1, 2 and 3, reference numeral 1 designates a substantially square U-shaped stabilizer bar which is rotatably supported on a car body (not shown) by supporting means 5 and has opposite arms 2 which are formed at their forward ends with flat portions 3 which are, in turn, centrally formed with fitting holes 4, respectively, having axes x orthogonal to a plane in which the arms 2 rock.

Reference numeral 6 designates a pair of lower arms adapted to support tires 8 so that these tires 8 may rock up and down around fulcra 7 mounted on the respective lower arms 6 which have brackets 9 fixed to their upper surfaces adjacent the respective tyres 8. Each of said brackets 9 is provided with a fitting hole 10 having its axis y extending in parallel to the associated one of said axes x.

Reference numeral 11 designates stepped bolts each comprising a large-diametered portion 12 and a small-diametered portion 13 which is stepwise continuous from said large-diametered portion 12 and formed therearound with a male thread 14. The stepped bolts 11 are inserted into the respective fitting holes 4 of the stabilizer bar 1 and the respective fitting holes 10 of the brackets 9. Collars 17 made of synthetic resin are put on the large-diametered portions 12 of the respective stepped bolts 11 and the ends 19 of coupling links 18 formed by round rods curved substantially in circular shapes are put on the respective collars 17. Washers 20 are applied against the respective collars 17 and nuts 21 are threaded on the small-diametered portions 13 having the male threads 15 with elastic members 15, 15 such as rubber pieces interposed between both sides of the respective circularly curved ends 19, on one hand, and said flat portions 3 and said washers 20, on the other hand. Said washers 20 are prevented by said nuts 21 from falling off.

According to this specific embodiment constructed as has been described hereinabove, the lower arms 6 rock around the respective fulcra 7 as the tires 8 are moved up and down relative to the car body, and such rocking movement causes the arms 2 of the stabilizer bar 1 to rock around the supporting means 5.

Consequently, the coupling links 18 rock not only around the axes x and y over a larger angle relative to the stabilizer bar 1 and the lower arms 6 but also in the plane including these axes x and y over a smaller angle wherein the relative rocking movement occurring around the axes x and y over the larger angle causes almost no elastic deformation of the elastic members 15, 15 and only the relative rocking movement occurring in the plane including the axes x and y over the smaller angle causes the elastic deformation of the elastic members 15, 15 so as to reduce plays of the stabilizer bar 1 as well as of the lower arms 6 and thereby to improve an anti-roll performance of the universal-joint.

While the specific embodiment shown relates to the joints between the stabilizer bar 1 and the lower arms 6 of motorcar, the invention is not limited to this and may find the other various applications wherein it is desired to joint a pair of members in such a manner that they may relatively rock around one set of axes over a larger angle and around another set of axes orthogonal to the first-mentioned set of axes over a smaller angle.

Figure 4:
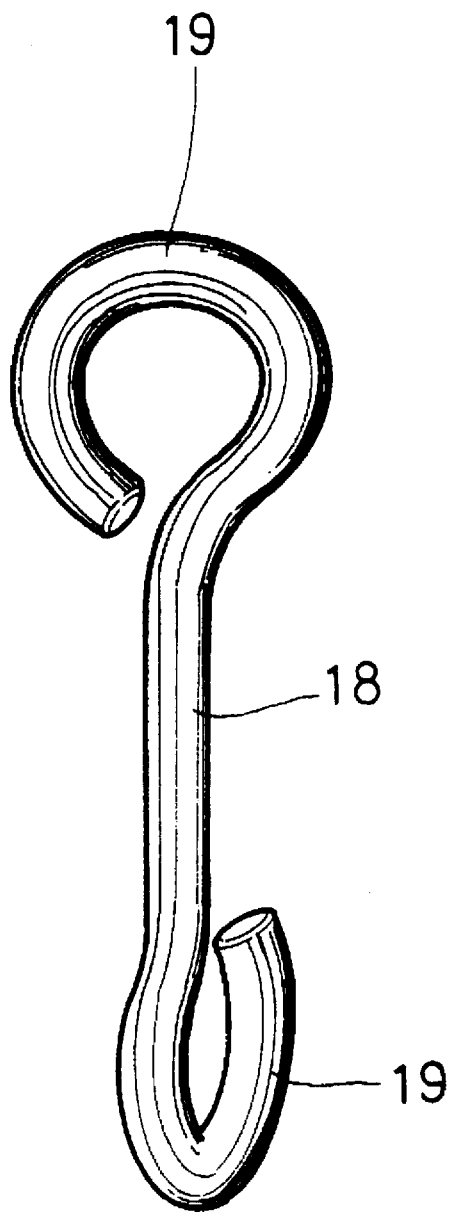
FIG. 4 is a perspective view shown a variant of the coupling link, according to the invention.
Figure 6:
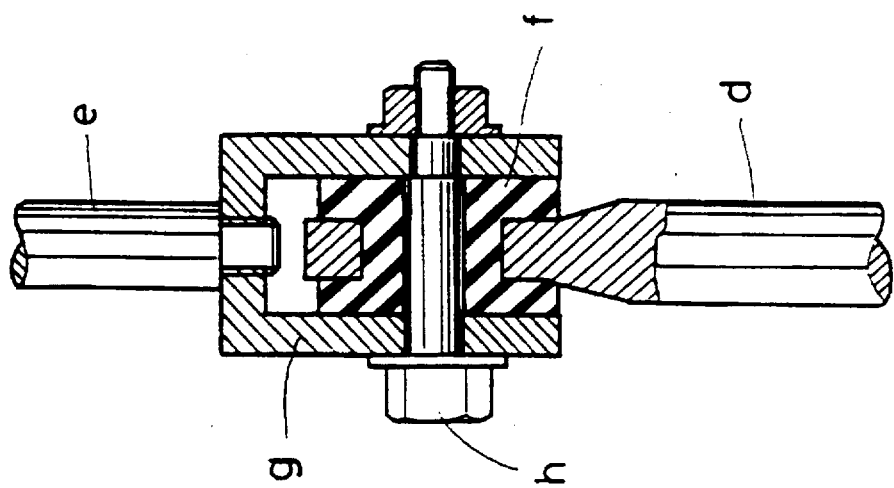
FIG. 6 is a view similar to FIG. 5 but showing another embodiment of the conventional universal-joint.
Figure 5:
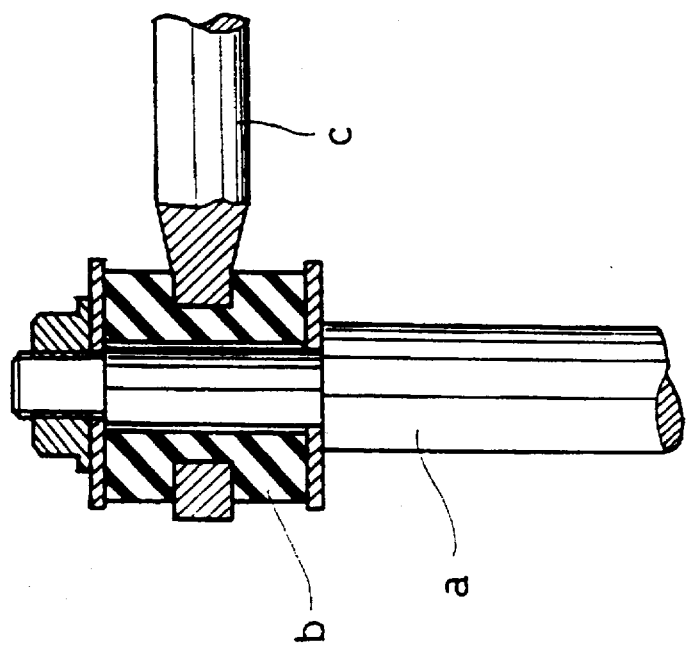
FIG. 5 is a sectional view showing an embodiment of the conventional universal-joint.

FIG. 4 shows a variant of the link 18 so configured that the opposite ends 19, 19 curved substantially in circular shapes have their axes being orthogonal to each other and it should be understood that the invention is applicable also to the case in which the links of such configuration are adopted.

We claim:

1. A universal joint for coupling a pair of spaced members comprising:

a coupling link coupling the pair of spaced coupled members;

each of said pair of coupled members having a fitting hole constituting a bolt hole thereon;

two stepped bolts each extending axially through a respective bolt hole of a corresponding coupled member and each defining a pivot axis for said coupling link about which the coupling link can pivotally rock;

said coupling link having opposite end portions each having a bolt hole through which a respective one of said bolts extends axially coupling the coupling link to said coupled members;

said bolts each having a length with a major diameter extending axially through a respective coupled member, a corresponding end portion of the coupling link, and a washer mounted thereon;

each bolt having an externally threaded length of minor diameter of each bolt for securing the washer on the coupling link;

each bolt having a sole elastic sleeve circumferentially directly on a corresponding length of said major diameter extending through the corresponding coupled member and through the coupling link to a side surface of a respective washer on the bolt; and each of said sleeves having a respective pair of elastic collars around opposite ends thereof, one of the elastic collars of each said pair being disposed between a corresponding coupled member and the coupling link and another of the collars being disposed between the coupling link and a respective washer on the corresponding bolt to reduce play and thereby allow the coupling link to pivot about each sleeve in circumferential opposite directions about the individual bolts and to pivot in opposite directions at each bolt on an axis normal to the longitudinal axis of the corresponding bolt.

2. A universal joint for coupling a pair of spaced members according to claim 1, in which said coupling link opposite end portions each comprises a loop for receiving a corresponding stepped bolt extending therethrough.

3. A universal joint for coupling a pair of spaced members according to claim 1, in which said coupling link opposite ends each comprise a loop for receiving a corresponding stepped bolt, and said stepped bolts extend axially in the same direction.

4. A universal joint for coupling a pair of spaced members according to claim 3, in which stepped bolts define pivotal axes substantially normal to each other in two different planes spaced a distance determined by a length of the coupling link.

5. A universal joint for coupling a pair of spaced members according to claim 1, in which said elastic sleeve and said elastic collars are made of synthetic resin.

* * * * *